United States Patent [19]
Iwata

[11] Patent Number: 5,386,402
[45] Date of Patent: Jan. 31, 1995

[54] ACCESS CONTROL APPARATUS AND ADDRESS TRANSLATION METHOD FOR DISK STORAGE DEVICE

[75] Inventor: Akitoshi Iwata, Tokyo, Japan

[73] Assignee: Kabushiki Kaisha Toshiba, Kawasaki, Japan

[21] Appl. No.: 158,565

[22] Filed: Nov. 29, 1993

[51] Int. Cl.$^6$ .......................... G11B 17/22; G11B 5/09
[52] U.S. Cl. ....................................... 369/32; 360/51; 360/49
[58] Field of Search .............. 369/32, 33, 30; 395/275, 400, 425; 300/51, 49, 48, 27, 77.02, 77.04, 78.04, 52, 98.01, 98.05

[56] References Cited
U.S. PATENT DOCUMENTS

| | | | |
|---|---|---|---|
| 4,894,734 | 1/1990 | Fischler et al. | 360/51 |
| 4,999,720 | 3/1991 | Wilson et al. | 360/48 |
| 5,087,992 | 2/1992 | Dahandeh et al. | 360/51 |
| 5,193,034 | 3/1993 | Tsuyoshi et al. | 360/51 |
| 5,276,564 | 1/1994 | Hessing et al. | 360/51 |

*Primary Examiner*—Robert J. Pascal
*Assistant Examiner*—Tan Dinh
*Attorney, Agent, or Firm*—Cushman, Darby & Cushman

[57] ABSTRACT

In a CDR-mode disk storage device, an HDC translates logical block addresses, generated by a host computer when the computer accesses the disk, to physical block addresses each consisting of a zone number, a head number, a track number, and a sector number. At this time, the HDC prepares a translation table which shows physical block addresses corresponding to logical block addresses. In the translation table, serial zone numbers 0–zn are set, serial head numbers 0–hn are set for each zone number, serial track numbers 0–tn are set for each head number, and serial sector numbers 0–sn are set for each track number. On the basis of the physical block addresses, the disk storage device can access sectors corresponding to a series of logical block addresses sequentially designated, without increasing the number of occasions of zone changing.

9 Claims, 8 Drawing Sheets

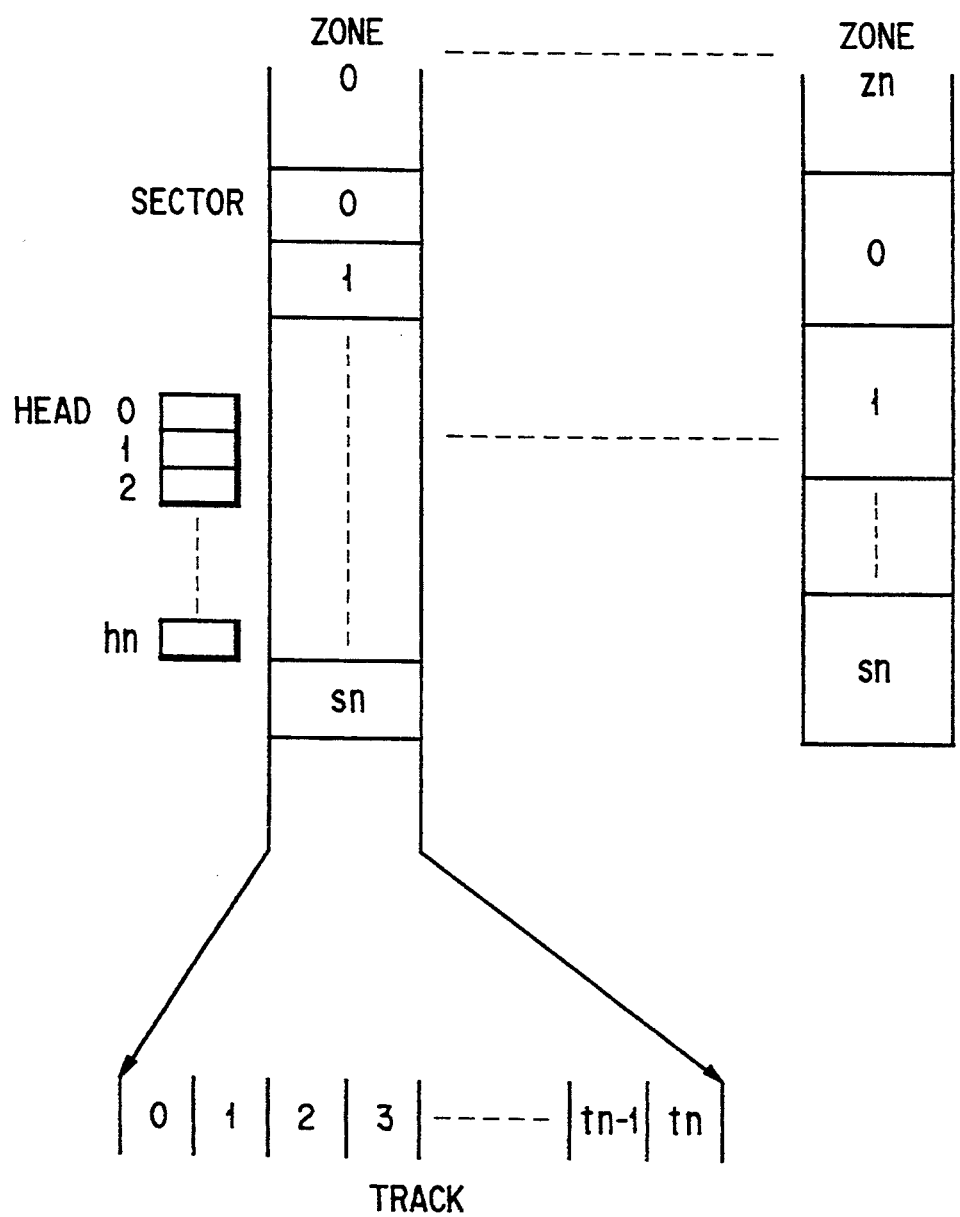
F I G. 5

| LOGICAL BLOCK ADDRESS | TRACK ADDRESS | HEAD | SECTOR 0 | 1 | 2 | 3 | 4 | ... | 48 | 49 |
|---|---|---|---|---|---|---|---|---|---|---|
| 0~49 | 0(0) | 0(0) | (0) | (1) | (2) | (3) | (4) | ... | (48) | (49) |
| 50~99 | 1(0) | 0(1) | (50) | (51) | (52) | (53) | (54) | ... | (98) | (99) |
| 100~149 | 2(1) | 0(0) | (100) | (101) | (102) | (103) | (104) | ... | (148) | (149) |
| 150~199 | 3(1) | 0(1) | (150) | (151) | (152) | (153) | (154) | ... | (198) | (199) |
| ... | ... | ... | ... | ... | ... | ... | ... | ... | ... | ... |
| 3000~3049 | 30(30) | 0(0) | (3000) | (3001) | (3002) | (3003) | (3004) | ... | (3048) | (3049) |
| 3050~3099 | 31(30) | 0(1) | (3050) | (3051) | (3052) | (3053) | (3054) | ... | (3098) | (3099) |
| ... | ... | ... | ... | ... | ... | ... | ... | ... | ... | ... |
| 100050~100099 | 1000 | 0(1) | | | | | | | | |

F I G. 7

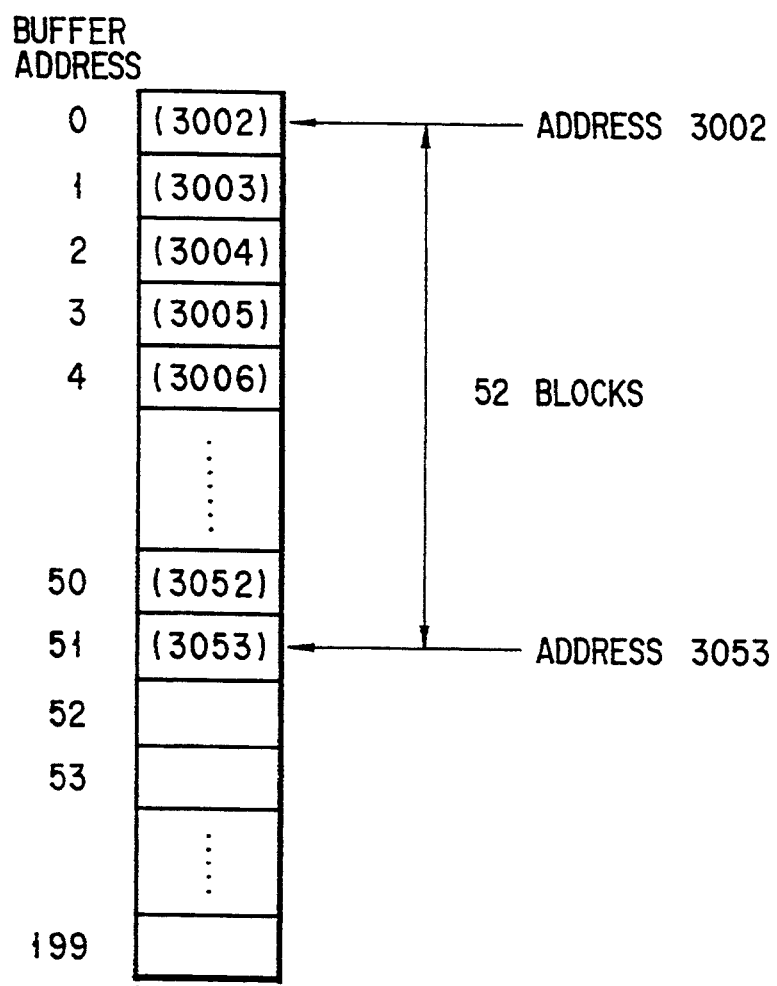
F I G. 8

ACCESS CONTROL APPARATUS AND ADDRESS TRANSLATION METHOD FOR DISK STORAGE DEVICE

BACKGROUND OF THE INVENTION

1. Field of the Invention

This invention relates to an access control apparatus for a disk storage device employing, in particular, a constant density recording CDR mode, which apparatus has an address translating function for translating logical block addresses supplied from a host computer to physical block addresses. The invention also relates to an address translation method employed in the apparatus.

2. Description of the Related Art

In the case of a conventional disk storage device such as a hard disk drive (HDD), the both opposite surfaces of a single disk or of each of disks are used as data surfaces, into and from which data items are recorded and reproduced. This device has a plurality of heads corresponding to data surfaces (e.g., two heads for a single disk), and read/write of data is performed by moving the heads in search of a target track on a target data surface and positioning one of the heads to the target track.

The data surface has many concentric tracks formed from its radially outermost portion to its radially innermost portion. The tracks which are formed on corresponding portions of the data surfaces are included in the same cylinder, and have the same address code consisting of a recognition track number (cylinder number). Further, each track has a plurality of sectors. In the disk storage device, data access is performed in units of a sector.

A host computer supplies the disk storage device with a logical block address which is irrelevant to a data-stored portion of a disk, when it performs data access (read access or write access). Then, the disk storage device translates the logical block address to a physical block address which is necessary to perform data access on the data surface of a disk in units of a sector. The physical block address is address data consisting of a head number, a track number, and a sector number.

The above address translation is performed by a controller (HDC) employed in the disk storage device. To designate physical block addresses, the HDC sequentially designates track numbers of a data surface corresponding to, for example, a head with a minimum head number (usually 0), from a radially-outermost-track number to a radially-innermost-track number. When the HDC reaches the radially-innermost-track number, it increases the head number from 0 to 1. On the contrary, the HDC may designate track numbers from the radially-innermost-track number to the radially-outermost-track number.

Recently, a disk storage device has been developed, which employs a constant density recording (CDR) mode. As is shown in FIG. 2, in the case of the CDR mode, the data surface of a disk 20 is divided into many concentric blocks called "zones", and each zone is divided into several tens—several hundreds of tracks. FIG. 2 shows a data surface divided into only three blocks 0, 1, and 2, for easy understanding. In this case, each of the tracks included in zone 0 has sectors 0–9.

Each track included in zone 1 is divided into sectors 0–7 in this case. Similarly, each track included in zone 2 is divided into sectors 0–5. In other words, more data items can be written at a higher transmission rate into the radially outermost zone 0 than into the radially inner zones 1 and 2.

Therefore, in the disk storage device employing the CDR mode, each time the zone to be accessed is changed from one to another at the time of reading/writing data, it is necessary to change the frequency of a write reference clock used in a read/write circuit, the gains of an analog filter and a PLL (phase-locked loop), etc., in accordance with data transmission rate set in each zone.

As is shown in FIG. 3A, each sector has an ID area 32 storing ID data for identifying the sector, and a user area 33 for reading/writing data when the host computer has accessed it. Further, as is shown in FIG. 2, in the case of the sector-servo type HDD, servo data items are prestored in the data surface of the disk 20 at regular intervals.

As is shown in FIG. 3A, servo data is stored in an area, which consists of an address data area 30 storing an address code corresponding to its track number (cylinder number), and a burst data area 31 storing a burst pattern to be used to position the head to the center of the track. In the case of a usual HDD of a type other than the CDR, servo data is stored in the tip portion of each sector.

In an HDD of the CDR mode, however, since the number of sectors in a zone differs from that in another zone, servo data is not necessarily stored in a tip portion of each sector. FIG. 3A shows an example of a format for e.g. sector 0 of zone 0. In this format, servo data is stored in a tip portion of sector 0. On the other hand, FIG. 3B shows an example of a format for sector 3 of zone 0. In this format, the areas 30 and 31 storing servo data are located such that they divide the user data area 33 into two portions. The same can be said of zones 1 and 2.

Actually, the host computer often sequentially accesses data items stored in a plurality of blocks (which are defined in units of a sector) by outputting a series of logical block addresses. If the above-described method of sequentially designating physical block addresses is employed in the CDR mode at the time of translating serial logical block addresses to physical block addresses, zone changing occurs many times. If the disk has a large number of zones, zone changing occurs too many times.

Specifically, where the number of zones is 10 and that of heads is 8, the number of changes of zones per one pass for designating a physical block address is 80 (=10×8). Since, as described above, the frequency of the write reference clock in the read/write circuit, etc., must be changed at the time of changing zones, a predetermined time period is required to perform zone changing. Increasing the time period required for zone changing in accordance with an increase in the number of occasions of zone changing will result in a reduction in the access rate of the disk storage device.

SUMMARY OF THE INVENTION

It is the object of the present invention to provide an access control apparatus for a CDR-mode disk storage device, which requires only a small number of occasions of zone changing when a host computer sequentially accesses data items stored in a plurality of blocks in the disk storage device, so that the computer can access the device at high speed.

To attain the object, the access control apparatus for a disk storage device, comprising: a disk having a plurality of data surfaces for storing data items, each data surface being divided into a plurality of zones as concentric blocks, each zone consisting of a plurality of tracks, and each track consisting of a plurality of sectors; head means having a plurality of heads, which are provided for each data surface, for reading and writing data items from and into the disk when a host computer requests access to the disk; address translation means for preparing a translation table used to translate a logical block address supplied from the host computer to a physical block address when the host computer accesses the disk, the translation table showing a plurality of physical block addresses each consisting of a corresponding zone number, a corresponding track number, and a corresponding sector number, the zone numbers, the track numbers, and the sector numbers being serial; and access control means for positioning a head with a designated head number to a track with a designated track number which is included in a zone with a designated zone number, on the basis of the physical block address obtained by the address translation means, so as to read and write data corresponding to the logical block address supplied from the host computer, from and into a sector with a designated sector number which is included in the track.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a view, useful in explaining address translation performed in the invention;

FIGS. 7 and 8 are views, useful in explaining address translation performed when a buffer memory according to the invention is used.

DETAILED DESCRIPTION OF THE PREFERRED EMBODIMENTS

Figure 1:
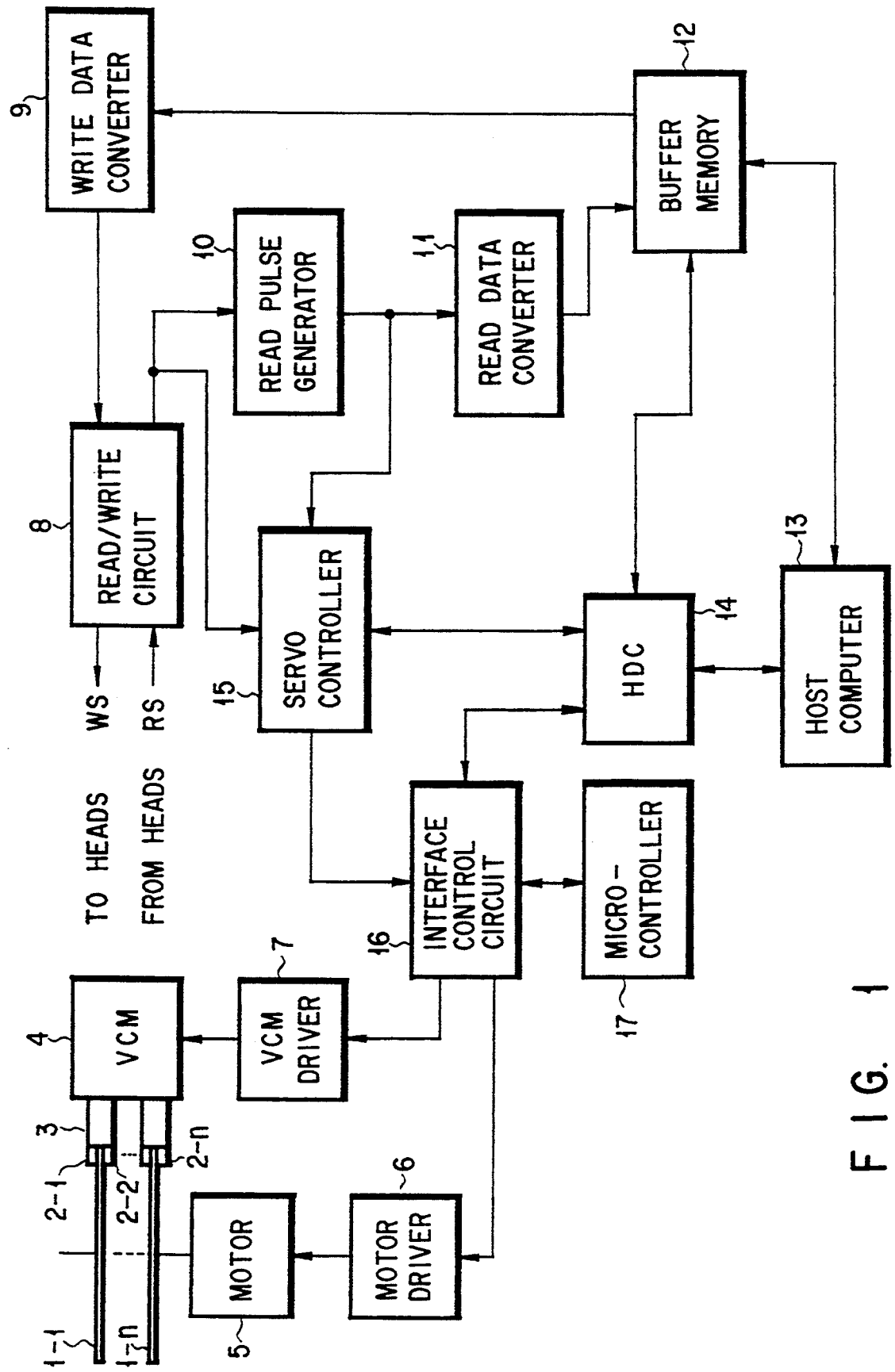
FIG. 1 is a block diagram, showing a disk storage device according to the invention.

The embodiments of the invention will be explained with reference to the accompanying drawings. FIG. 1 is a block diagram, showing an essential part of a disk storage device according to the invention and consisting of a hard disk drive (HDD) having a plurality of disks 1-1-1-n.

Figure 2:
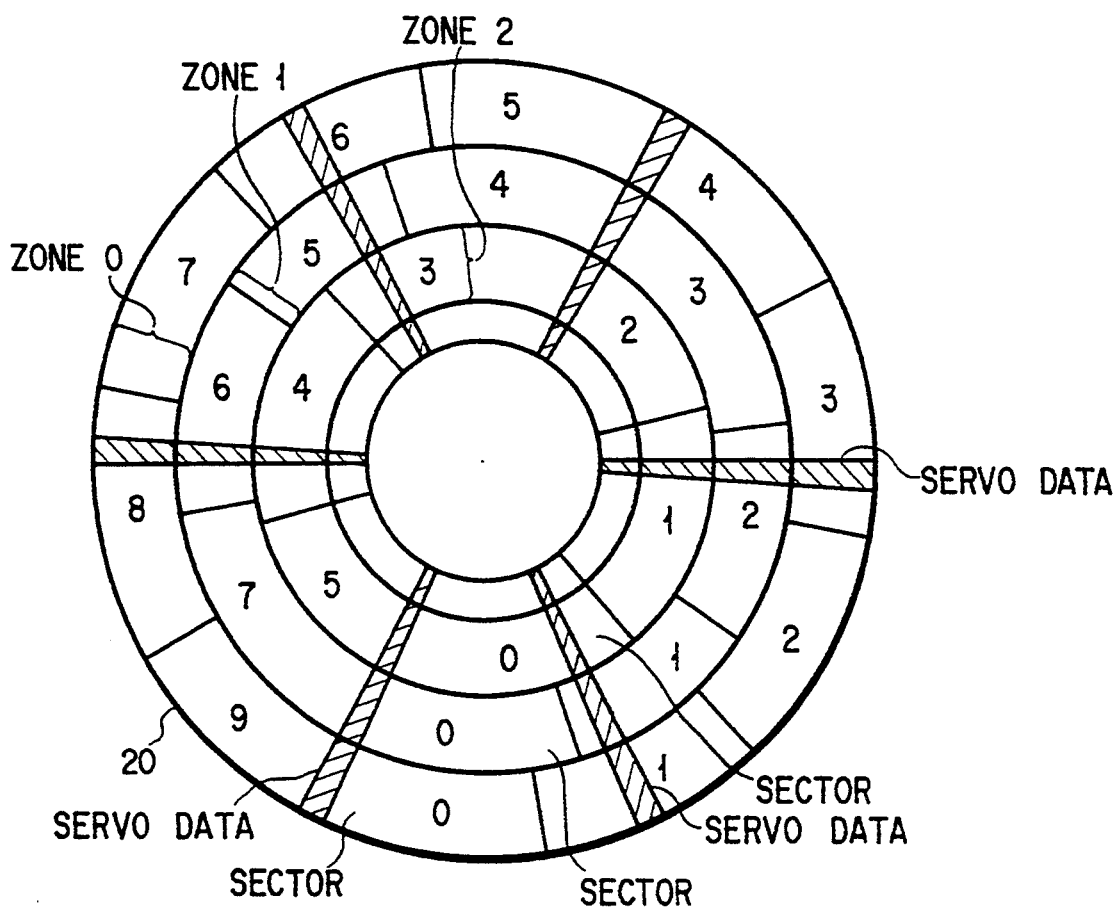
FIG. 2 is a view, useful in explaining a format used in a conventional CDR-mode disk.

As is shown in FIG. 2, in the disk storage device, each of the disks 1-1-1-n has two data surfaces with a CDR-mode format. Each data surface is divided into a plurality of concentric zones (with respective numbers 1-zn) from a radially outermost portion to a radially innermost portion. Each zone has several tens—several hundreds of tracks (with respective numbers 0-tn), and these tracks have different data transfer rates. It is not necessary that the number of the tracks of one zone is equal to that of another zone. The track number is also called "cylinder number". Although the track numbers of physical block addresses are usually serial numbers through the disks 1-1-1-n, in this embodiment the track numbers are set independently in each zone for easy understanding. Specifically, a zone 1 has tracks 0-100, and a zone 100 has tracks 0-10.

Figure 3A:
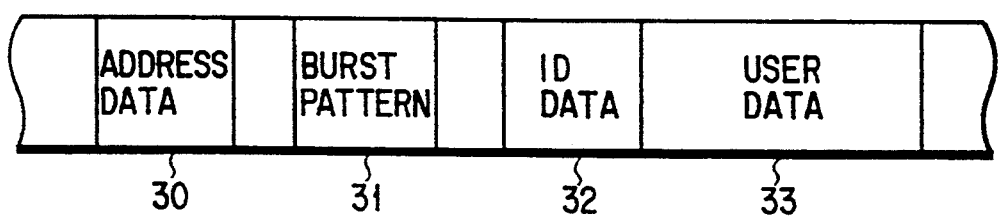
FIGS. 3A and 3B are views, useful in explaining formats for conventional CDR-mode sectors.

Further, each track is divided into a plurality of sectors (with numbers 0-sn). In the HDD, data access is performed in units of a sector. In the CDR mode, the more radially outer portion of the data surface the track is located on, the more sectors the track has. As is shown in FIG. 3A, each sector has an ID area 32 storing ID data for identifying the sector, and a user area 33 for reading/writing data when the host computer has accessed it. Further, as is shown in FIG. 2, in the case of the sector-servo type HDD, servo data items are prestored in the data surface of the disk 20 at regular intervals.

As is shown in FIG. 3A, servo data is stored in an area, which consists of an address data area 30 storing an address code corresponding to its track number (cylinder number), and a burst data area 31 storing a burst pattern to be used to position the head to the center of the track. In the case of a usual HDD of a type other than the CDR, servo data is stored in the tip portion of each sector.

Figure 3B:
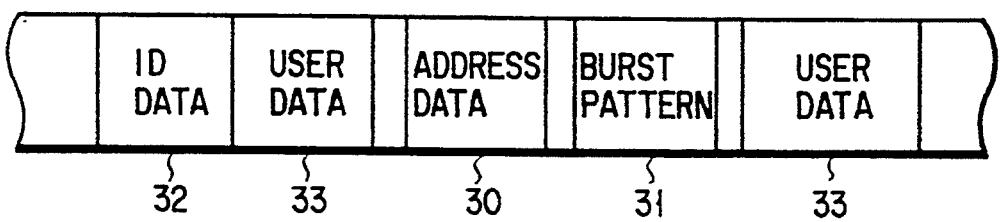

In an HDD of the CDR mode, however, since the number of sectors in a zone differs from that in another zone, servo data is not necessarily stored in a tip portion of each sector. FIG. 3A shows an example of a format for e.g. sector 0 of zone 0. In this format, servo data is stored in a tip portion of sector 0. On the other hand, FIG. 3B shows an example of a format for sector 3 of zone 0. In this format, the areas 30 and 31 storing servo data are located such that they divide the user data area 33 into two portions. The same can be said of zones 1 and 2. The disks 1-1-1-n are rotated by means of a spindle motor 5, which is controlled by a motor driver 6.

The disk storage device has a plurality of heads 2-1-2-n corresponding to the data surfaces of the disks 1-1-1-n, respectively. These heads are attached to a carriage 3, and are moved in the radial direction of the disks in accordance with movement of the carriage 3, to read/write data items at designated tracks of the data surfaces. The carriage 3 is driven by means of a voice coil motor (VCM) 4. The VCM 4 is driven by means of a VCM driver 7. Two heads 2-1 and 2-2 are provided for one disk to correspond to the opposite data surfaces of the disk.

The heads 2-1-2-n write data items on the data surfaces in accordance with a write signal (write current) WS supplied from the read/write circuit 8. The read/write circuit 8 receives read current RS from the heads 2-1-2-n to perform signal processing for generating a read signal required for data reproduction. The read/write circuit 8 has signal processing circuits such as an amplifier with an AGC (automatic gain control) function, and an analog filter, etc.

The read/write circuit 8 generates a write signal WS corresponding to write data modulated by a write data converter 9. At the time of data writing by write access of a host computer 13, write data from the computer 13 is stored in a buffer memory 12. The write data converter 9 modulates the write data stored in the buffer memory 12 with use of a predetermined recording mode such as MFM (modified frequency modulation).

A read pulse generator 10 generates a read pulse signal from an analog read signal generated by the read/write circuit 8. A read data converter 11 has a PLL (phase-locked loop) circuit, a data pulse discrimination circuit, a data decoder, etc., and decodes the read data of a predetermined recording mode to generate a reproduced data. The read pulse generator 10 stores the reproduced data in the buffer memory 12.

A hard disk controller (HDC) 14 is a structural element of the invention for performing translation, and comprises an interface circuit between the host computer 13 and the HDD and a CPU (microprocessor). The HDC 14 exchanges interface signals with the host computer 13, and receives a logical block address transmitted from the host computer 13. The HDC 14 converts the logical block address to a physical block address, and performs access control on the basis of the physical block address. The HDC 14 performs address control of the buffer memory 12, to control data exchange with the host computer 13. Further, the HDC 14 exchanges with a micro-controller 17, via an interface control circuit 16, various control signals (i.e., data items) required to perform seek control of the heads 2-1-2-n. In the invention, the HDC 14 supplies the micro-controller 17 with a physical block address which is data on a target position to be sought by the heads 2-1-2-n, and receives a sector pulse or an index pulse from a servo controller 15.

The servo controller 15 reproduces servo data required to the seek control of the heads 2-1-2-n, and supplies it to the micro-controller 17 via the interface control circuit 16. In other words, the servo controller 15 extracts address data (i.e., an address code stored in the address data area 30 shown in FIGS. 3A and 3B) on the servo data from a read pulse train generated by the read pulse generator 10. Further, the servo controller 15 extracts a burst signal (i.e., a burst pattern stored in the burst data area 31 shown in FIGS. 3A and 3B) from a read signal supplied by the read/write circuit 8, and converts the burst signal to burst data by use of an A/D converter contained therein.

The micro-controller 17 is a micro-computer dedicated to driving control of the heads 2-1-2-n and disks 1-1-1-n. The micro-controller 17 creates control data required for seek control of the heads 2-1-2-n, on the basis of the servo data from the controller 15 and the physical block address from the HDC 14. The interface control circuit 16 converts control data, supplied from the micro-controller 17, to an analog signal by use of an D/A converter contained in the circuit 16, and outputs the signal to the VCM driver 7. Thus, micro-controller 17 drives the VCM 4 causes the heads 2-1-2-n to seek the target position (target track) designated by the physical block address. In addition, the micro-controller 17 responds to an interface signal (motor driving signal) from the HDC 14, and drives the spindle motor 5 to rotate the disks 1-1-1-n.

The address translation according to the invention and performed in the above-described disk storage device will be explained.

When the host computer 13 performs write/read access to the disks 1-1-1-n, it supplies the HCD 14 with a logical block address for designating an object to be accessed. The logical block address is a logical address assigned to that data as an object to be accessed, which is divided in units of a block with a size according to that of a sector.

All sectors of the disks 1-1-1-n have their respective physical block addresses. Each physical block address is address data for designating a sector number indicative of a given physical position on the data surface (i.e., an address corresponding to the logical block address). Accordingly, when the host computer 13 requests access to the disk device and supplies a logical block address thereto, the disk device (more specifically, the HDC 14) converts the logical block address to a corresponding physical block address, which address enables access to a designated sector.

To access a sector corresponding to a given logical block address, it is necessary to designate head number 0-hn indicative of a target data surface of the disks 1-1-1-n, to designate a track number indicative of a target track on the target data surface, and to read a target sector number (stored in the ID data area 32 shown in FIGS. 3A and 3B). Thus, a physical block address must be address data with a head number, a track number, and a sector number. The HDC 14 performs address translation to obtain a logical block address corresponding to a physical block address.

As is shown in FIG. 5, in the CDR mode, each data surface is divided into a plurality of zones, and each zone has many tracks. In this embodiment, each zone has tracks with numbers 0-tn. The number of tracks included in a zone is not necessarily equal to that of tracks included in another zone. In the CDR-mode address translation, one of zone numbers 0-zn is designated, and then one of track numbers 0-tn assigned to the designated zone number is designated.

Figure 4A:
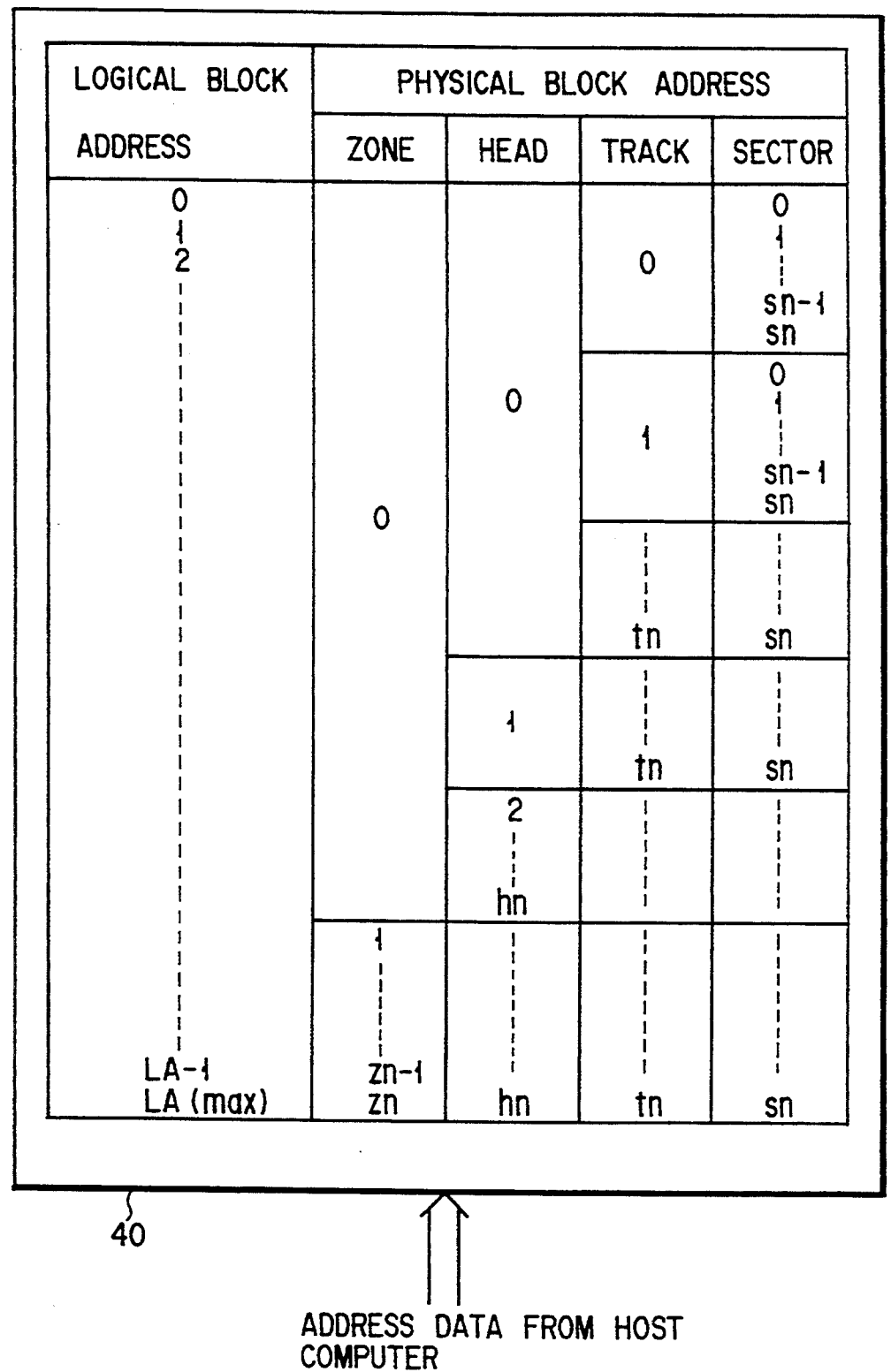
FIGS. 4A and 4B are views, useful in explaining an address translation table used in the invention.

As is shown in FIG. 4A, each time the host computer accesses the HDC 14, the HDC 14 prepares by calculation a translation table 40 for obtaining a physical block address from a logical block address. The table 40 shows physical block addresses which correspond to logical block addresses 0-LA transmitted from the host computer 13, and consist of zone numbers 0-zn, head numbers 0-hn, track numbers 0-tn, and sector numbers 0-sn. Head numbers 0-hn are set for each zone number, track numbers 0-tn are set for each head number, and sector numbers 0-sn are set for each track number.

Figure 6:
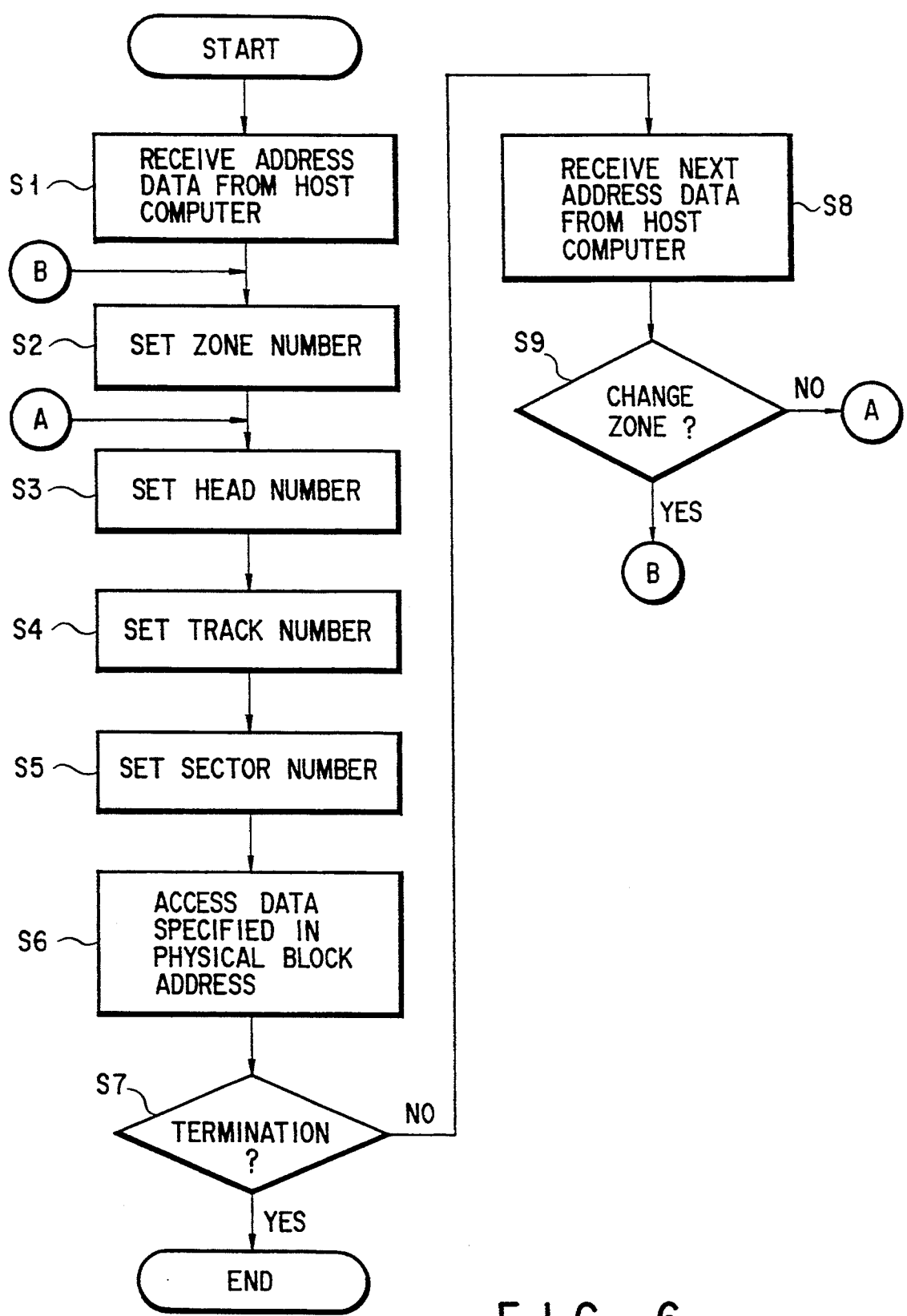
FIG. 6 is a flowchart, useful in explaining the address translation performed in the invention.

As is shown in the flowchart of FIG. 6, the HDC 14 performs address translation, i.e. prepares the table 40, to obtain a physical block address. Specifically, the HDC 14 receives a logical block address 0, ..., or LA supplied from the host computer 13 when the computer accesses the HDC 14 (step S1). The HDC 14 calculates a physical block address corresponding to the supplied logical block address. Specifically, zone number 0,..., or zn is designated, head number 0, ..., or hn set for the designated zone number is designated, track number 0, ..., or tn set for the designated head number is designated, and sector number 0, ..., or sn set for the designated track number is designated (steps S2-S5). For example, when the host computer 13 supplies a logical block address 0, the HDC 14 calculates a physical block address consisting of zone number 0, head number 0, track number 0, and sector number 0. Similarly, when the host computer 13 supplies a logical block address 2, the HDC 14 calculates a physical block address consisting of zone number 0, head number 0, track number 0, and sector number 2.

The HDC 14 supplies the micro-controller 17 with the obtained physical block address via the interface control circuit 16. Operation of the micro-controller 17 and the servo controller 15 based on the physical block address causes a designated sector on a data surface corresponding to the logical block address to be accessed (step S6).

Suppose that the host computer 13 performs read access and supplies a logical block address 0. The HDC 14 prepares a table 40 with a physical block address consisting of zone number 0, head number 0, track number 0, and sector number 0. Then, the VCM 4 is driven in accordance with the physical block address, to cause the heads 2-1-2-n to seek regions of the disks 1-1-1-n respectively corresponding to zone number 0, and then to position the head 2-1 with head number 0 in a central portion of a track with track number 0. The head 2-1 with head number 0 reads data from a sector with sector number 0, included in the track with track number 0 (see FIG. 5). The data thus read is stored in the buffer memory 12 via the read pulse generator 10 and the read data converter 11. The HDC 14 controls the buffer memory 12 to transmit the read data to the host computer 13.

On the other hand, when the host computer 13 performs write access, write data is supplied from the computer 13 to the buffer memory 12. The write data is transmitted from the buffer memory 12 to the write data converter 9, where it is modulated in a predetermined mode. Further, the write data is converted to a write signal WS by means of the read/write circuit 8, and is supplied to the head 2-1 with head number 0. Thus, the head 2-1 writes data corresponding to the write data, into a sector with sector number 0 included in a track with track number 0, which is included in a zone with zone number 0.

After completing access operation in a sector with sector number 0, the HDC 14 repeats address translation if the host computer 13 sequentially outputs a logical block address 1 (steps S7–S9). If the zone number changes from 0 to 1, i.e., if the answer to the question of the step S9 is Yes, it is necessary in the CDR mode to change the frequency of the write reference clock of the read/write circuit 8, and the gains of the analog filter and of the PLL (phase-locked loop) circuit in accordance with the data transmission rate set in each zone. Therefore, zone changing which follows logical block address changing will inevitably reduce the access rate by a time period required for the zone changing.

Actually, however, there are many cases where the host computer 13 accesses the HDD while designating a series of logical block addresses.

Referring to FIG. 4A, suppose that the host computer 13 designates a series of logical block addresses 0–2. At this time, the HDC 14 translates the logical block addresses from the host computer 13, to a series of physical block addresses. As is described above, the translation table shows physical block addresses which correspond to the logical block addresses 0–LA, and consist of zone numbers 0–zn, head numbers 0–hn set for each zone number, track numbers 0–tn set for each head number, and sector numbers 0–sn set for each track number.

In the address conversion processing in the invention, the above serial logical block addresses 0–2 designated by the host computer 13 can be translated to corresponding physical block addresses without changing zone numbers, or after a very small number of occasions of zone-number changing. Thus, processing using the translation table can reduce the number of occasions of zone changing when sectors corresponding to a series of logical block addresses are accessed.

As described above, since in the CDR-mode HDD, processing using the translation table can greatly reduce the number of occasions of zone-number changing performed to obtain physical block addresses when a series of logical block addresses are designated by the host computer 13, the access rate at which read or write access is performed to sectors corresponding to the serial logical block addresses can be prevented from being reduced.

In the above-described embodiment, the HDC 14 prepares translation table 40 shown in FIG. 4A, i.e. address translation processing, wherein the track numbers 0–tn which are assigned to a designated one of head numbers 0–hn assigned to a designated one of zone numbers 0–zn are sequentially designated.

Figure 4B:
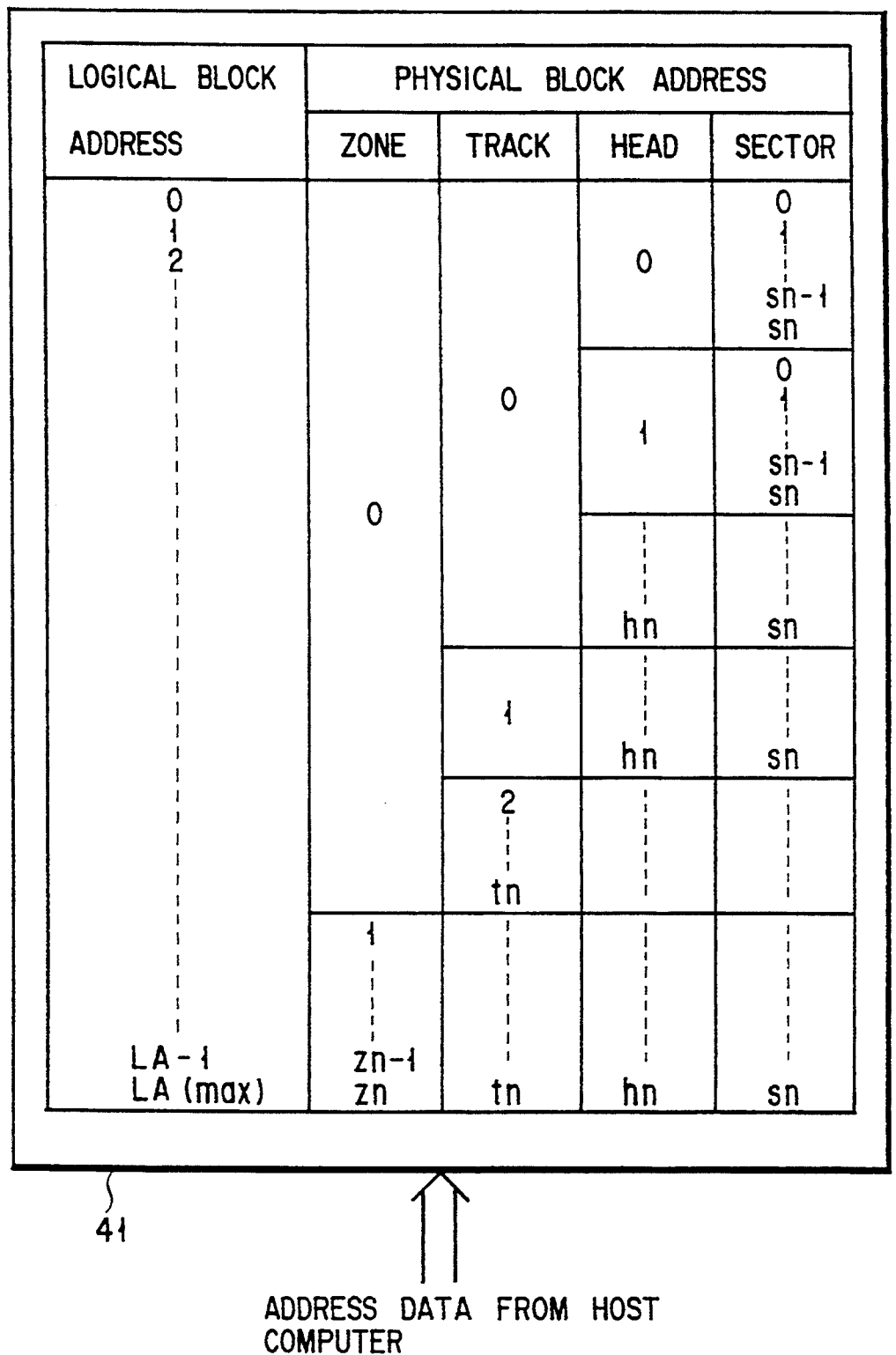

In the invention, address translation processing for preparing a translation table 41 shown in FIG. 4B may be performed in place of that using the translation table 40 shown in FIG. 4A. In this case, the head numbers 0–hn which are assigned to a designated one of track numbers 0–tn assigned to a designated one of zone numbers 0–zn are sequentially designated. In other words, when having received that one of logical block addresses 0–LA which has been transferred from the host computer 13, the HDC 14 searches, from the translation table 41, a physical block address corresponding to the received block address.

Specifically, one of zone numbers 0–zn is designated, and then that one of track numbers 0–tn which is assigned to the designated zone number is designated. Subsequently, head numbers 0–hn and sector numbers 0–sn, which are assigned to the designated track number, are sequentially designated.

The systems for preparing the translation tables 40 and 41, respectively, have the following differences:

In the case of the system for preparing the translation table 41, the head numbers assigned to the same track number as the designated zone number are sequentially designated. As regards the same track number as the designated zone number, only the head numbers are switched from one to another, which means that each head does not move physically. On the other hand, in the case of preparing the translation table 40, the track numbers assigned to a designated zone number are sequentially designated, and a head with a designated head number is physically moved to a track corresponding to the designated track number.

The HDC 14 temporarily stores in the buffer memory 12 data (read or write data) corresponding to a logical block address designated by the host computer 13. The HDC 14 assigns to the data a buffer address stored in the memory 12 and corresponding to the logical block address.

Then, referring to FIGS. 7 and 8, storage operation of data in the buffer memory 12 will be explained. Here, suppose that the HDD employs a single disk and two heads (with head numbers 0 and 1) corresponding to the two data surfaces of the disk, and that each of tracks (with track numbers 0–1000) included in a zone has 50 sectors (with sector numbers 0–49), as is shown in FIG. 7.

In the case of the address translation processing system for preparing the translation table 40 shown in FIG. 4A, the HDC 14 converts a logical block address from the host computer 13, to a physical block address consisting of head number 0, track number 0, ..., or 1000, and sector number 0, ..., or 49 (here, its zone number is omitted). Further, in the case of the address translation processing system for preparing the translation table 41 shown in FIG. 4B, the HDC 14 converts a logical block address from the host computer 13, to a physical block address consisting of track number 0, ..., or 1000, head number 0 or 1, and sector number 0, ..., or 49. This case corresponds to that case shown in FIG. 7 which uses parenthetic head numbers and track addresses or numbers (i.e., these numbers are obtained when the translation table 41 is used).

For example, suppose that the host computer 13 has requested write access and sequentially designated logical block addresses 3002–3053. This means that the host computer 13 supplies the HDD with 52 blocks of write data (i.e., 52 sectors of data) corresponding to the logical block addresses 3002–3053.

In the case of the address translation processing system for preparing the translation table 40, the HDC 14 assigns logical block addresses 3002–3049 to sector numbers 2–49 assigned to track number 30 on the data surface corresponding to head number 0. The remaining logical block addresses 3050–3053 are assigned to sector numbers 0–3 assigned to track number 31 on the data surface corresponding to head number 0.

On the other hand, in the case of the address translation processing system for preparing the translation table 41, the HDC 14 assigns logical block addresses 3002–3049 to sector numbers 2–49 assigned to track number 30 on the data surface corresponding to head number 0. The remaining logical block addresses 3050–3053 are assigned to sector numbers 0–3 assigned to track number 30 on the data surface corresponding to head number 1.

Further, as is shown in FIG. 8, the HDC 14 stores 52 blocks of write data (corresponding to the logical block addresses 3002–3053) in the areas of the buffer memory 12 which have buffer addresses 0–52, respectively.

When a target track (with track number 30 or 31) has been sought by moving each head on the basis of the physical block address obtained by the HDC 14, a first sector is accessed. The head with head number 0 detects a sector with sector number 2 in the target track. Upon detection of the sector, the HDC 14 reads write data corresponding to a logical block address 3002 from the buffer memory 12, and transmits the data to the read/write circuit (i.e., the circuit 8 and the converter 9 shown in FIG. 1). The head with head number 0 writes the transmitted write data into the sector with sector number 2. Subsequently, a sector with sector number 3 is detected, and write data corresponding to a logical block address 3003 is transmitted from the buffer memory 12 to the read/write circuit.

At this time, in the case of the address translation processing system for preparing the translation table 40, the track number is changed from 30 to 31, while the head number is maintained at 0. Upon detection of each of sector numbers 0–3, each write data item corresponding to the logical block address 3050,..., or 3053 is read and transmitted from the buffer memory 12.

On the other hand, in the case of the address translation processing system for preparing the translation table 41, the head number is changed from 0 to 1, while the track number is maintained at 30. Upon detection of each of sector numbers 0–3, each write data item corresponding to the logical block address 3050, ..., or 3053 is read and transmitted from the buffer memory 12.

All the write data items still remain in the buffer memory 12 even after they are written into the data surface. As a result, if read access to the logical block addresses 3004–3053 is requested immediately after the write access request, the HDC 14 uses the write data items stored in the buffer memory 12 as read data items, and transmits them to the host computer 13 without accessing the disk. Thus, the invention dispenses with the time period required at the time of read access to move a target head and access a target sector, thereby increasing read access speed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An access control apparatus for a disk storage device, comprising:
   a disk having a plurality of data surfaces for storing data items, each data surface being divided into a plurality of zones as concentric blocks, each zone consisting of a plurality of tracks, and each track consisting of a plurality of sectors;
   head means having a plurality of heads, which are provided for each data surface, for reading and writing data items from and into the disk when a host computer requests access to the disk;
   address translation means for preparing a translation table used to translate a logical block address supplied from the host computer to a physical block address when the host computer accesses the disk, the translation table showing zone numbers, head numbers and track numbers, the head numbers constituting the physical block address, being assigned to each of zone numbers, and being sequentially arranged, the track numbers being assigned to each of the head numbers and sequentially arranged, and the sector numbers being assigned to each of the track numbers and sequentially arranged; and
   access control means for positioning a head with a designated head number to a track with a designated track number which is included in a zone with a designated zone number, on the basis of the physical block address obtained by the address translation means, so as to read and write data corresponding to the logical block address supplied from the host computer, from and into a sector with a designated sector number which is included in the track.

2. The apparatus according to claim 1, wherein when the host computer supplies a series of logical block addresses, the access control means fixes a designated one of the head numbers assigned to a designated one of the zone numbers, thereby accessing a designated one of the track numbers assigned to the designated zone number, and sequentially accessing the sector numbers assigned to the designated track number, on the basis of a series of physical block addresses corresponding to the serial logical block addresses.

3. The apparatus according to claim 1, wherein the number of sectors of each track included in a zone located on a radially outer portion of the data surface is larger than the number of sectors of each track included in a zone located on a radially inner portion of the data surface, and data is written into each sector included in the radially outer zone at higher transmission rate than into each sector included in the radially inner zone.

4. The apparatus according to claim 1, wherein the head means has at least two heads corresponding to the opposite data surfaces of the disk, and the access control means controls each head to seek a track with a designated track number on the disk to thereby position the head on a cylinder containing the track.

5. The apparatus according to claim 1, further comprising:
a buffer memory for storing write data which is supplied from the host computer and is to be written into the disk, and for storing read data which is read from the disk; and
read/write means for supplying the head means with a write signal corresponding to the write data stored in the buffer memory, converting a read signal supplied from the head means to the read data, and storing the read data in the buffer memory;
and wherein the access control means supplies the read/write means with the write data stored in the buffer memory on the basis of the physical block address, and supplies the host computer with the read data stored in the buffer memory via the read/write means.

6. The apparatus according to claim 4, wherein the access control means includes a servo system for positioning the head means to a cylinder containing a track with a designated track number, on the basis of servo data prestored in the disk.

7. A method of translating logical block addresses into corresponding physical block addresses in a disk storage device having a disk and head means, the disk having a plurality of data surfaces for storing data items, each data surface being divided into a plurality of zones as concentric blocks, each zone consisting of a plurality of tracks, and each track consisting of a plurality of sectors, and the head means having a plurality of heads, which are provided for each data surface, for reading and writing data items from and into the disk when a host computer accesses the disk;
the method comprising the steps of:
preparing a translation table for translating logical block addresses transmitted from the host computer when the host computer accesses the disk, to physical block addresses, and setting, in the translation table, serial zone numbers, serial head numbers for each zone number, serial track numbers for each head number, and serial sector numbers for each track number;
translating logical block addresses transmitted from the host computer, to corresponding physical block addresses each consisting of a zone number, a head number, a track number, and a sector number; and
positioning a head with a designated head number to a track with a designated track number included in a zone with a designated zone number, and reading/writing data corresponding to the logical block address transmitted from the host computer, into a sector with a designated sector number included in the track.

8. An access control apparatus for a disk storage device, comprising:
a disk having a plurality of data surfaces for storing data items, each data surface being divided into a plurality of zones as concentric blocks, each zone consisting of a plurality of tracks, and each track consisting of a plurality of sectors;
head means having a plurality of heads, which are provided for each data surface, for reading and writing data items from and into the disk when a host computer requests access to the disk;
address translation means for preparing a translation table used to translate a logical block address supplied from the host computer to a physical block address when the host computer accesses the disk, the translation table showing zone numbers, track numbers and head numbers, the track numbers constituting the physical block address, being assigned to each of zone numbers, and being sequentially arranged, the head numbers being assigned to each of the track numbers and sequentially arranged, and the sector numbers being assigned to each of the head numbers and sequentially arranged; and
access control means for positioning a head with a designated head number to a track with a designated track number which is included in a zone with a designated zone number, on the basis of the physical block address obtained by the address translation means, so as to read and write data corresponding to the logical block address supplied from the host computer, from and into a sector with a designated sector number which is included in the track.

9. The apparatus according to claim 1, wherein when the host computer supplies a series of logical block addresses, the access control means fixes a designated one of the track numbers assigned to a designated one of the zone numbers, thereby accessing a designated one of the head numbers assigned to the designated zone number, and sequentially accessing the sector numbers assigned to the designated track number, on the basis of a series of physical block addresses corresponding to the serial logical block addresses.

* * * * *